(12) United States Patent
Mazzagatte et al.

(10) Patent No.: US 6,862,583 B1
(45) Date of Patent: Mar. 1, 2005

(54) AUTHENTICATED SECURE PRINTING

(75) Inventors: Craig Mazzagatte, Aliso Viejo, CA (US); Royce E. Slick, Mission Viejo, CA (US); Neil Iwamoto, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/411,665

(22) Filed: Oct. 4, 1999

(51) Int. Cl.$^7$ .............................. H04L 9/32; G06F 1/24
(52) U.S. Cl. ............................ 705/64; 380/25; 380/51; 380/55; 705/51; 705/57; 713/155
(58) Field of Search .............................. 380/18, 21, 25, 380/51; 705/51, 57

(56) References Cited

U.S. PATENT DOCUMENTS

| | | | | |
|---|---|---|---|---|
| 5,191,611 A | * | 3/1993 | Lang ........................... 380/25 |
| 5,392,351 A | | 2/1995 | Hasebe et al. ................. 380/4 |
| 5,398,283 A | * | 3/1995 | Virga .......................... 380/18 |
| 5,495,533 A | * | 2/1996 | Linehan et al. ............... 380/21 |
| 5,606,613 A | * | 2/1997 | Lee et al. ..................... 380/21 |
| 5,633,932 A | * | 5/1997 | Davis et al. .................. 380/25 |
| 5,720,012 A | | 2/1998 | McVeigh et al. ........... 395/113 |
| 5,752,697 A | | 5/1998 | Mandel et al. ............. 271/288 |
| 5,903,646 A | | 5/1999 | Rackman ....................... 380/4 |
| 5,933,498 A | | 8/1999 | Schneck et al. ............... 380/4 |
| 5,933,501 A | | 8/1999 | Leppek ........................ 380/21 |
| 5,949,881 A | | 9/1999 | Davis ......................... 380/25 |
| 6,111,953 A | * | 8/2000 | Walker et al. ................ 380/51 |
| 6,314,521 B1 | | 11/2001 | Debry ......................... 713/201 |
| 6,343,361 B1 | | 1/2002 | Nendell et al. .............. 713/171 |
| 6,378,070 B1 | | 4/2002 | Chan et al. .................. 713/155 |
| 6,385,728 B1 | | 5/2002 | DeBry ......................... 713/201 |
| 6,430,690 B1 | | 8/2002 | Vanstone et al. ............. 713/182 |
| 6,466,921 B1 | | 10/2002 | Cordery et al. ............... 705/60 |

FOREIGN PATENT DOCUMENTS

| | | | |
|---|---|---|---|
| EP | 0 542 703 | 5/1993 | |
| EP | 0 657 845 | 6/1995 | |
| EP | 0 671 830 | 9/1995 | |
| EP | 0 858 021 | 8/1998 | |
| EP | 0 935 182 | 8/1999 | |
| EP | 0 935 182 A1 * | 8/1999 | ............. G06F/1/00 |
| JP | 3-269756 | 2/1991 | |
| WO | WO 98/07254 | 2/1998 | |

OTHER PUBLICATIONS

Dannenberg, Roger B., et al., "A Butler Process for Resource Sharing on Spice Machines", ACM Transactions on Office Information Systems, vol. 3, No. 3, pp. 234–252, Jul. 1985.

* cited by examiner

*Primary Examiner*—John W. Hayes
*Assistant Examiner*—Daniel L. Greene
(74) *Attorney, Agent, or Firm*—Fitzpatrick, Cella, Harper & Scinto

(57) ABSTRACT

Authorized printout of an image corresponding to print data received at a print node from a network. The authorized printout comprises encrypting print data by a print node and storing the encrypted print data without printout, receiving authentication of an intended recipient to print the print data, and decrypting the encrypted print data by the print node and printing the decrypted print data by an image forming device, responsive to receipt of authentication in the receiving step. The print node may be the image forming device itself or a gateway to multiple image forming devices. The print node encrypts the print data with either a symmetric key or an asymmetric key.

50 Claims, 9 Drawing Sheets

AUTHENTICATED SECURE PRINTING

BACKGROUND OF THE INVENTION

1. Field of the Invention

The present invention concerns authorized printing wherein a hard-copy image is printed only in the presence of an intended recipient. In particular, the invention concerns encryption of print data by a print node, and storing the encrypted print data without printout until the print node receives proper authentication from the intended recipient

2. Description of the Related Art

In a network environment, a print job generated at one location in the network can be printed at another location. Occasionally, confidential or otherwise sensitive information has to be printed. When the confidential information is transmitted to the printer, the sender may want to protect the data transmission over the network from electronic interception or at least prevent unauthorized viewing of the hard-copy printout. Generally, common encryption protocols such as SSL or TLS can be used to provide the required security from electronic interception of the transmission. Nonetheless, concerns remain about unauthorized viewing of the hard-copy printed output or electronic viewing of print jobs stored in the print queue.

In particular, if a print job containing confidential information is sent to a printer, the sender may not be present at the printer when the image is printed. During the time that it takes the sender to reach the printer to pick-up the hard-copy print job, the printed output can be viewed by any person who comes across the printed output before the sender has reached the printer. As a result, confidential information may be compromised by being viewed by an unauthorized person.

In addition, if the sender reaches the printer before the printer prints the image, and numerous print jobs are pending in the print queue before his, the sender would have to wait until all previously pending print jobs are printed before he can obtain his print job. As a result, the sender must either spend time waiting for his print job to print out or return later. In the latter case, the sender risks the possibility that his confidential print out will be printed before he is able to return.

Further, print jobs that have been stored in a file (local to the printer or in a remote file server) prior to printout are subject to electronic viewing by unauthorized personnel. Therefore, the stored print data must also be protected from unauthorized viewing.

Similar issues arise with a facsimile transmission. Namely, the printed output can be viewed by any person who arrives at the destination facsimile machine before the intended recipient.

Therefore, a method of printing an image only in the presence of the intended recipient and securely storing print data is needed.

One method of printing a document only in the presence of the intended recipient is disclosed in U.S. Pat. No. 5,633,932. According to the patent, a sending node encrypts a print job and a printing node decrypts the print job prior to printout. If the print job contains confidential information, the sending node generates an encrypted header signifying that fact, using a public key of the printing node. The printing node contains its own private key, and upon receiving the encrypted print job, decrypts the header to ascertain whether the document requires authentication by the intended recipient before printing. If so, the print data is stored without printout in encrypted form until the print node receives the proper authentication from the intended recipient. If the print node determines that the document does not require authentication, the print node decrypts and prints the document.

The present invention also ensures that printout of sensitive documents is authorized and that the print data is securely stored, but it does so in ways that are different from the aforementioned U.S. Pat. No. 5,633,932.

SUMMARY OF THE INVENTION

The present invention achieves authorized printout of print data received by a print node by encrypting the print data at the print node and storing the encrypted print data without printout until the print node receives authentication from the intended recipient. Once the proper authentication is presented, the print node decrypts the print data and a printout is generated by the print node based on the print data.

Accordingly, in one aspect the invention is authorized printout of an image corresponding to print data received at a print node from a network. The print data is encrypted by the print node and the encrypted print data is stored without printout. The print node then receives authentication from the intended recipient to print the print data. In response to the authentication, the print node decrypts the encrypted print data and the image is printed by an image forming device.

As a result of the foregoing arrangement, a print job having confidential information can only be printed in the presence of the intended recipient having the proper authentication. Also, the print data sent to the print node is securely stored by being encrypted by the print node, which uses a key unique to the print node such that the encrypted print data can only be decrypted by the print node after the intended recipient has supplied proper authentication to the print node.

Additionally, the print job is not required to be encrypted at the sending node before being sent to the print node. However, in order to provide secure data transmission over the network, a secure data transmission protocol, such as SSL (Secure Sockets Layer) or TLS (Transport Layer Security) can be used to provide a more efficient transmission from the sending node to the print node.

In further aspects of the foregoing arrangement, the print node may be any image forming device, such as a printer or a facsimile, connectable to a network and having the capability of performing the print data encryption/decryption itself. Alternatively, the print node may be a gateway connected to multiple printers, where the gateway performs the print data encryption/decryption.

Also, smart-cards or smart-card chips are preferably utilized to supply the authentication to the print node. The smart-cards are preferably read by a smart-card reader located at the image forming device and connected to the print node so that the print node can confirm that the intended recipient is present at the image forming device when the image is printed.

Additionally, the encryption performed by the print node may be performed using either a symmetric algorithm or an asymmetric (public/private key) algorithm. As further security, a symmetric key may be further encrypted by an asymmetric key.

This brief summary has been provided so that the nature of the invention may be understood quickly. A more com-

DETAILED DESCRIPTION OF THE PREFERRED EMBODIMENTS

The present invention is generally directed to secure printing of image data such that the image data can only be printed on an image forming device in the presence of an intended recipient. The present invention therefore provides a manner by which a document can be securely transmitted from a computer to a remote image forming device in a networked environment, such as a Local Area Network (LAN), a Wide Area Network (WAN), or the Internet. The document is maintained in a secure fashion until the intended recipient is present at the image forming device, whereupon the image forming device prints the image.

Figure 1:
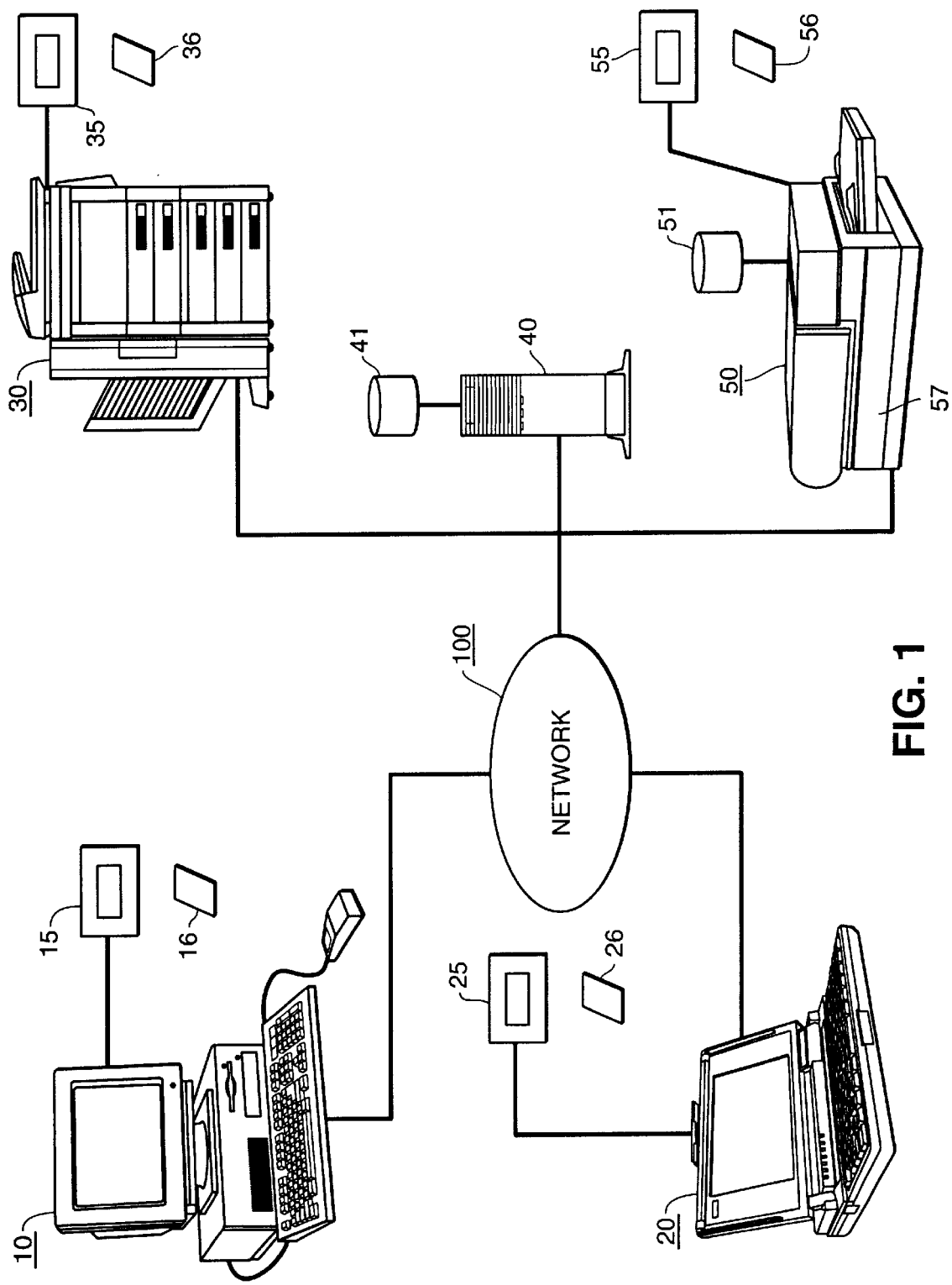
FIG. 1 is a representative view of a networked computing environment in which the present invention may be implemented.

FIG. 1 provides an overall system view of a networked computing environment in which the present invention may be implemented. As shown in FIG. 1, the networked computing environment comprises a network which is connected to desktop computer 10, laptop computer 20, server 40, digital copier 30 and printer 50. Network 100 is preferably an Ethernet network medium consisting of a bus-type physical architecture, although the invention can be utilized over other types of networks, including the internet.

Desktop computer 10 is preferably an IBM PC-compatible computer having a windowing environment such as Microsoft Windows 95, Windows 98 or Windows NT. As is typical with IBM PC-compatible computers, desktop computer 10 preferably has a display, keyboard, mouse, floppy drive and/or other type of storage medium (not shown). Also attached to desktop computer 10 is smart-card interface device 15 for interfacing with a smart-card of a computer user, such as smart-card 16. Smart-card 16 therefore provides a mechanism whereby a computer user can authenticate the user's identity to desktop computer 10. In addition, smart-card 16 contains a private key of a private/public key pair which is specific to a computer user and which is used in the present invention for the secure printing of image data as discussed more fully below.

Laptop computer 20 is also an IBM PC-compatible computer having a windowing environment such as Microsoft Windows 95, Windows 98 or Windows NT. Like desktop computer 10, laptop computer 20 also has a display, keyboard, mouse and floppy drive or other storage means (not shown). In addition, laptop computer 20 also has a smart-card interface device 25 attached to it for interfacing to the smart-card of a computer user such as smart-card 26. Also attached to network 100 is digital copier 30, which is capable of receiving image data over network 100 for printing. Digital copier 30 also has attached smart-card interface device 35 for interfacing with the smart-card of a print job recipient, such as smart-card 36. In addition, server 40 is also connected to network 100. Server 40 preferably comprises an IBM PC-compatible computer having an operating system such as DOS, Microsoft Windows 95, Windows 98 or Windows NT, UNIX or other operating system. Server 40 has a storage device 41 which is preferably a large fixed disk for storing numerous files. Server 40 can therefore be utilized by other devices on network 100 as a file server and may also act as a gateway for other devices on network 100 to another network such as the Internet.

Printer 50 is also connected to network 100 and is preferably a laser or bubble-jet printer which is capable of operating as both a printer and a facsimile device. Printer 50 has a storage device 51 which is preferably a large fixed disk, and also has an embedded smart-chip 57 which contains a private key of a private/public key pair corresponding to printer 50 for use in encryption and/or decryption of data received by printer 50. In addition, printer 50 is connected to smart-card interface device 55 which is capable of interfacing with a smart-card of a print job recipient, such as smart-card 56. In this manner, the printing of a print job for a particular intended recipient may be controlled through the use of smart-card interface device 55 and smart-card 56, in combination with smart-chip 57 in printer 50.

Figure 2:
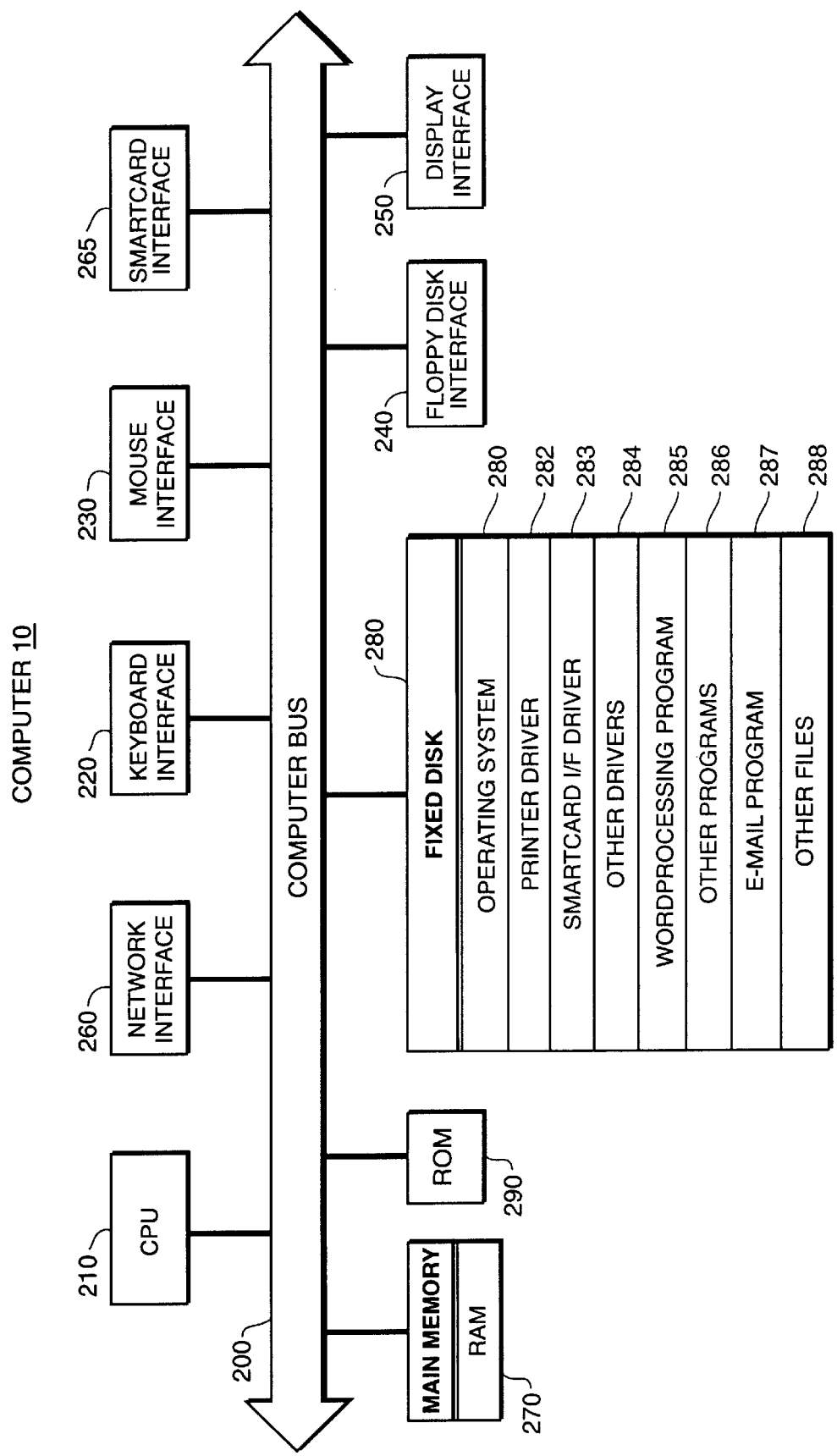
FIG. 2 is a detailed block diagram showing the internal architecture of the computer shown in FIG. 1 according to the present invention.

FIG. 2 is a block diagram showing an overview of the internal architecture of desktop computer 10. In FIG. 2, desktop computer 10 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a pointing device, floppy disk interface 240 for interfacing to a floppy disk, display interface 250 for interfacing to a display, network interface 260 for interfacing to network 100, and smart-card interface 265 for interfacing to smart-card interface device 15.

Random access memory ("RAM") 270 interfaces to computer bus 200 to provide central processing unit ("CPU") 210 with access to memory storage, thereby acting as the main run-time memory for CPU 210. In particular, when executing stored program instruction sequences, CPU 210 loads those instruction sequences from fixed disk 280 (or other memory media) into random access memory ("RAM")

270 and executes those stored program instruction sequences out of RAM 270. It should also be noted that standard-disk swapping techniques available under windowing operating systems allow segments of memory to be swapped to and from RAM 270 and fixed disk 280. Read-only memory ("ROM") 290 stores invariant instruction sequences, such as start-up instruction sequences for CPU 210 or basic input/output operation system ("BIOS") sequences for the operation of peripheral devices attached to computer 10.

Fixed disk 280 is one example of a computer-readable medium that stores program instruction sequences executable by central processing unit ("CPU") 210 so as to constitute operating system 281, printer driver 282, smart-card interface driver 283, other drivers 284, word processing program 285, other programs 286, e-mail program 287 and other files 288. As mentioned above, operating system 281 is preferably a windowing operating system, although other types of operating systems may be used with the present invention. Printer driver 282 is utilized to prepare image data for printing on at least one image forming device, such as printer 50. Smart-card interface driver 283 is utilized to drive and control smart-card interface 265 for interfacing with smart-card interface device 15 so as to read and write to a smart-card such as smart-card 16. Other drivers 284 include drivers for each of the remaining interfaces which are coupled to computer bus 200.

Word processing program 285 is a typical word processor program for creating documents and images, such as Microsoft Word, or Corel WordPerfect. Other programs 286 contains other programs necessary to operate desktop computer 10 and to run desired applications. E-mail program 287 is a typical e-mail program that allows desktop computer 10 to receive and send e-mails over network 100. Other files 288 include any of the files necessary for the operation of desktop computer 10 or files created and/or maintained by other application programs on desktop computer 10.

Figure 3:
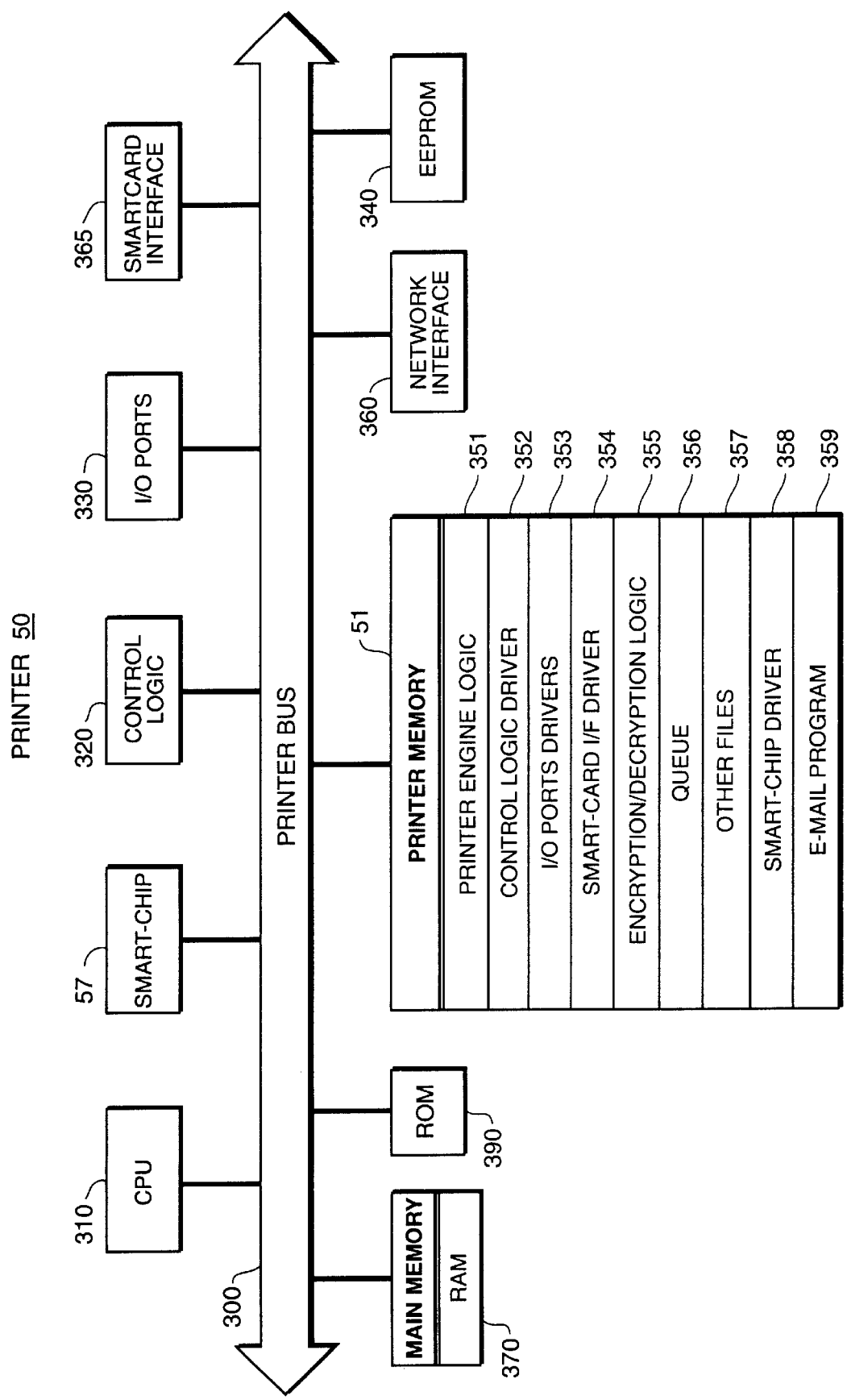
FIG. 3 is a detailed block diagram showing the internal architecture of the printer shown in FIG. 1 according to the present invention.

FIG. 3 is a block diagram showing an overview of the internal architecture of printer 50. In FIG. 3, printer 50 is seen to contain a printer smart-chip 57 which, as previously mentioned, contains a private key corresponding to printer 50 for encryption/decryption purposes. Printer 50 also contains a central processing unit ("CPU") 310 such as a programmable microprocessor which is interfaced to printer bus 300. Also coupled to printer bus 300 are control logic 320, which is utilized to control the printer engine of printer 50 (not shown), I/O ports 330 which is used to communicate with various input/output devices of printer 50 (not shown), smart-card interface 365 which is utilized to interface with smart-card interface device 55, and network interface 360 which is utilized to interface printer 50 to network 100.

Also coupled to printer bus 300 are EEPROM 340, for containing non-volatile program instructions, random access memory ("RAM") 370, printer memory 51 and read-only memory ("ROM") 390. RAM 370 interfaces to printer bus 300 to provide CPU 310 with access to memory storage, thereby acting as the main run-time memory for CPU 310. In particular, when executing stored program instruction sequences, CPU 310 loads those instruction sequences from printer memory 51 (or other memory media) into RAM 370 and executes those stored program instruction sequences out of RAM 370. ROM 390 stores invariant instruction sequences, such as start-up instruction sequences for CPU 310 or BIOS sequences for the operation of various peripheral devices of printer 50 (not shown).

Printer memory 51 is one example of a computer-readable medium that stores program instruction sequences executable by CPU 310 so as to constitute printer engine logic 351, control logic driver 352, I/O port drivers 353, smart-card interface driver 354, encryption/decryption logic 355, queue 356, other files 357, printer smart-chip driver 358, and e-mail program 359. Printer engine logic 351 and control logic driver 352 are utilized to control and drive the printer engine of printer 50 (not shown) so as to print an image according to image data received by printer 50, preferably over network 100. I/O port drivers 353 are utilized to drive the input and output devices (not shown) connected through I/O ports 330. Smart-card interface driver 354 is utilized to drive smart-card interface 365 for interfacing to smart-card interface device 55, thereby enabling printer 50 to read and write to a smart-card such as smartcard 56.

Encryption/decryption logic 355 enables printer 50 to receive encrypted data according to the present invention and to carry out the necessary steps to enable the decryption of the encrypted print data in the presence of an intended recipient. The details of these steps are discussed more fully below. Queue 356 is utilized to contain a print queue comprised of numerous print jobs which are to be printed. Other files 357 contain other files and/or programs for the operation of printer 50. Printer smart-chip driver 358 is utilized to interface with printer smart-chip 57 for certain cryptographic operations. Lastly, e-mail program 359 is a typical e-mail program for enabling printer 50 to receive e-mail messages from network 100. Such e-mail messages may contain print job-related information, as discussed in more detail below.

Figure 4:
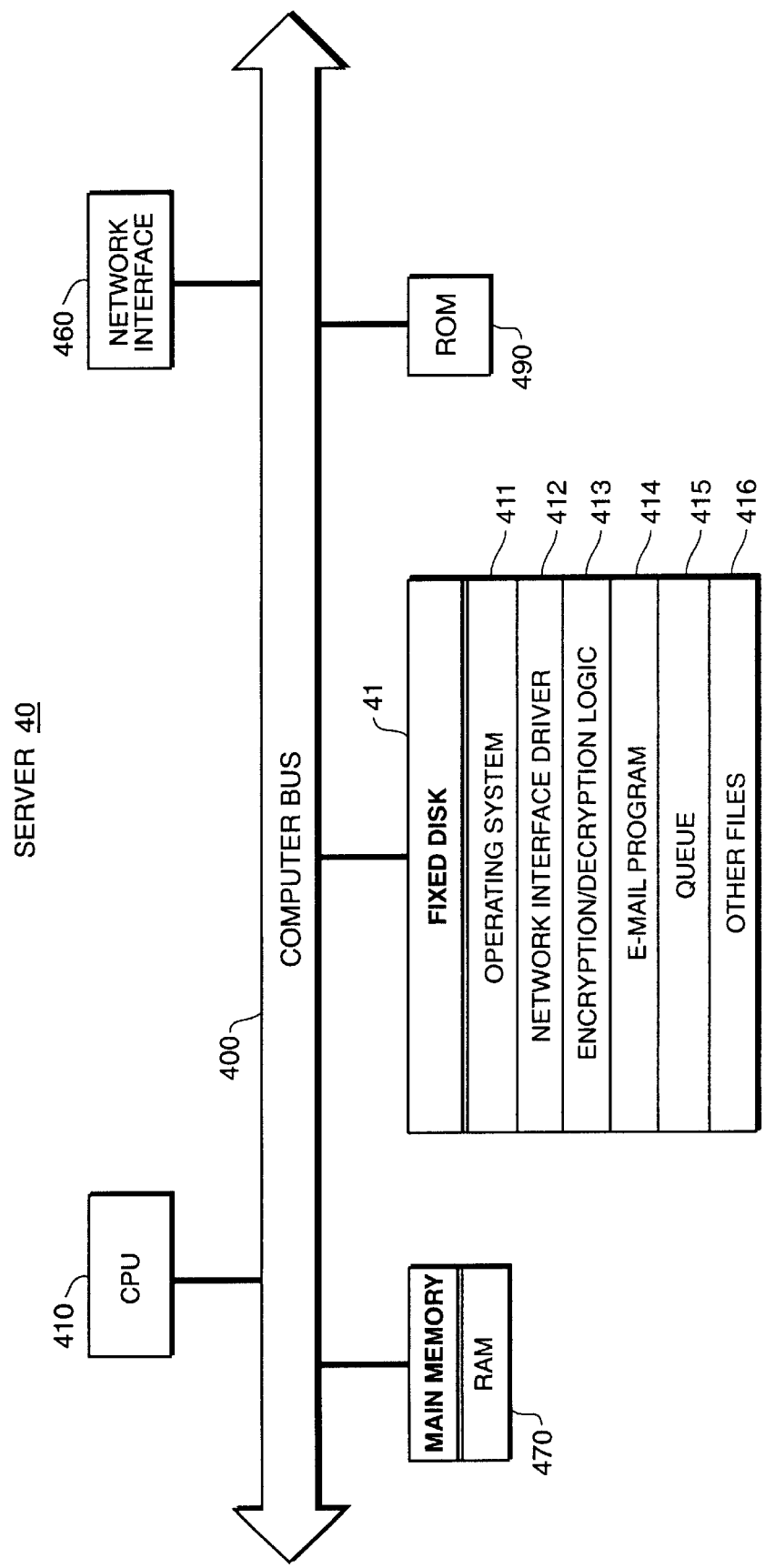
FIG. 4 is a detailed block diagram showing the server shown in FIG. 1 according to the present invention.

FIG. 4 is a block diagram showing an overview of the internal architecture of server 40. In FIG. 4, server 40 is seen to include a central processing unit ("CPU") 410 such as a programmable microprocessor which is interfaced to computer bus 400. Also coupled to computer bus 400 is a network interface 460 for interfacing to network 100. In addition, random access memory ("RAM") 470, fixed disk 41, and read-only ("ROM") 490 are also coupled to computer bus 400. RAM 470 interfaces to computer bus 400 to provide CPU 410 with access to memory storage, thereby acting as the main run-time memory for CPU 410. In particular, when executing stored program instruction sequences, CPU 410 loads those instruction sequences from fixed disk 41 (or other memory media) into RAM 470 and executes those stored program instruction sequences out of RAM 470. It should also be recognized that standard disk-swapping techniques allow segments of memory to be swapped to and from RAM 470 and fixed disk 41. ROM 490 stores invariant instruction sequences, such as start-up instruction sequences for CPU 410 or basic input/output operating system ("BIOS") sequences for the operation of peripheral devices which may be attached to server 40 (not shown).

Fixed disk 41 is one example of a computer-readable medium that stores program instruction sequences executable by CPU 410 so as to constitute operating system 411, network interface driver 412, encryption/decryption logic 413, e-mail program 414, queue 415, and other files 416. As mentioned above, operating system 411 can be an operating system such as DOS, Windows 95, Windows 98, Windows NT, UNIX, or other such operating system. Network interface driver 412 is utilized to drive network interface 460 for interfacing server 40 to network 100. Encryption/decryption logic 413 allows server 40 to receive encrypted data and to either maintain such data in queue 415 or to send such data to an image forming device such as printer 50 for printing. Encyrption/decryption logic 413 is generally only required where a secure transmission protocol is used between the server and the printer. E-mail program 414 is a typical e-mail program and enables server 40 to receive and/or send e-mail messages over network 100. Queue 415 is utilized to store numerous print jobs for output on one or more image forming devices, such as printer 50. Lastly, other files 416 contains other files or programs necessary to operate server 40 and/or to provide additional functionality to server 40.

Authenticated secure printing according to the present invention will now be described in more detail with regard to FIGS. 5 through 8.

It should be noted that with regard to the terms "sender" and "intended recipient" as used in the following discussion, "sender" refers to the person who submits a print job from the host computer to be printed out by an image forming device. The "intended recipient" refers to the person who arrives at the image forming device to retrieve the print job. In some cases, the sender and the intended recipient may be one in the same. That is, the person who sends the print job may intend that he/she be the only person to retrieve the printout from the image forming device. In other cases, the sender and the intended recipient may be different individuals. For example, the sender may submit a print job that he intends only to be retrieved by a specified person other than him/herself. However, for the purposes of the following discussion, the term "sender/intended recipient" refers to the person holding the proper authentication information to retrieve the image from the image forming device.

Additionally, the term "image forming device" as it relates to the following discussion means a printer, such as a laser-jet or ink-jet printer. However, it should be noted that the present invention may be utilized in any image forming device, such as a facsimile, or a remote computer having a display.

Figure 5:
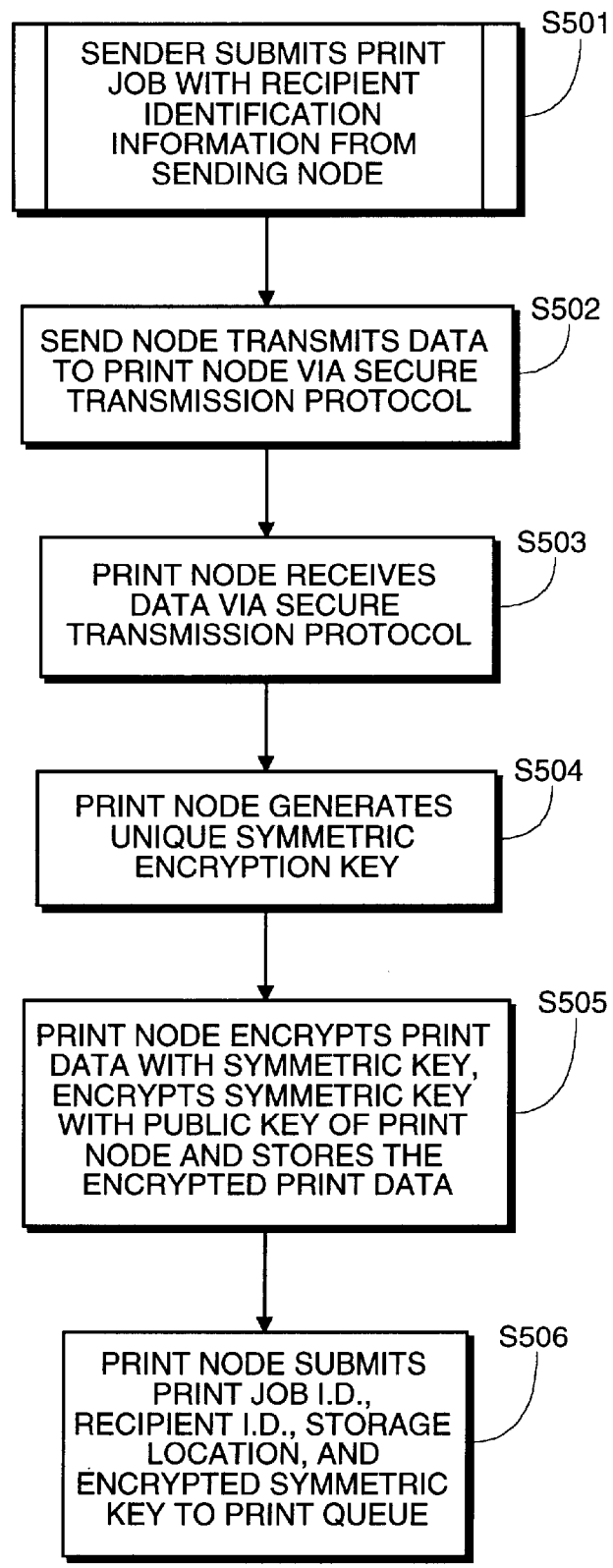
FIG. 5 is a flowchart depicting a print node encrypting print data and storing the encrypted print data according to the present invention.

Referring now to the drawings, FIG. 5 is a flowchart depicting a print job being submitted to a print node, the print node encrypting the print data and storing the encrypted print data according to the present invention.

In this regard, the term "print node" means either an image forming device or a gateway to one or multiple image forming devices. That is, the print node may be an image forming device itself provided with the capability of performing encryption/decryption tasks, or the print node may be a gateway, such as a network server, that provides the capability of performing the encryption/decryption tasks.

As seen in FIG. 5, in step S501 the sender submits a print job from a sending node, such as desktop computer 10 or laptop computer 20. The print job is generally submitted through commonly known printer driver techniques. For example, if the sender is utilizing a word processor application program, such as Microsoft Word or Corel Wordperfect, and wants to print the document; he would normally select a print option within the application program, thereby activating a printer driver. The printer driver usually permits the sender to select printing options, such as printing speed, print resolution, or number of copies.

One such print option is an option to select a secure or non-secure transmission mode, whereby a printer driver selects either a secure or non-secure transmission protocol for transmitting the print job based on the senders selection. For example, the sender may opt for a normal (non-secure) transmission mode, in which case the print driver transmits the print job over the network with no security utilizing a standard TCP/IP protocol or the like. Alternatively, the sender may opt for a secure transmission mode, in which case the printer driver transmits the print job using a secure transmission protocol such as Secure Sockets Layer (SSL) or Transport Layer Security (TLS). These latter protocols provide a means for transmitting data across a network in encrypted format to prevent electronic interception of the data.

In the present invention, the print job is preferably transmitted using one of the aforementioned secure transmission protocols. As will be discussed in more detail below, utilization of a secure transmission protocol in the present invention is one method of providing an indication to the print node to distinguish a print job that requires authentication before printout from one that does not. However, the print job may also be transmitted utilizing a non-secure TCP/IP protocol, such as by providing a special driver at the sending node to encrypt the data before transmission and then transmitting the encrypted data to the print node. In such a case, the print node would first decrypt the encrypted print data before continuing to process the data according to the invention.

As seen in FIG. 5, in step S501 the sender submits the print job along with unique identification information, sometimes called a distinguished name, identifying the person who is the intended recipient. This information is generally contained in a digital certificate. The identification information links the print job to the intended recipient, so that only the intended recipient is able to print the print job. More specifically, identification information such as the intended recipient's first name, last name, country, locality (city), organization, organization unit, or other information that is unique to him is linked to the print job.

This information may be obtained and linked to the print job by various methods. For example, the sender could insert a smart-card into a smart-card reader located at the sending node, such as smart-card reader 15 connected to computer 10 as seen in FIG. 1. The smart-card could contain the recipient's unique identification information in digital form which is supplied to the computer through smart-card interface 265. Alternatively, the information may be obtained from a digital certificate, obtained via a Public Key Infrastructure, over the internet, by e-mail or some other means. In this case, the information could be downloaded to computer 10 over the internet to be subsequently submitted with the print job.

After obtaining the aforementioned unique identification information, the sender selects the desired transmission protocol from the print driver and submits the print job. As previously mentioned, in the present invention the preferred transmission protocol is a secure transmission protocol such as SSL. Because SSL is readily available to provide any necessary data encryption during the transmission process, the use of SSL eliminates the need for a special driver in the sending node to encrypt the data before transmission. Additionally, as will be discussed below, the use of SSL provides an indication used by the print node to indicate that the print job is one that should only be printed out upon proper authentication by the intended recipient.

After selecting the transmission protocol and obtaining the intended recipient information according to the foregoing, the sender submits the data to be printed and the sending node transmits the data via the secure transmission protocol (step S502).

The aforementioned data is then received by the print node (step S503) via the secure transmission protocol. In the present invention, the print node assumes that all data received via a secure transmission protocol, here SSL, is confidential and requires authentication before printout; and as a consequence the print job is encrypted and stored by the print node. With this feature, the print node does not ordinarily require a special driver to read header information that would otherwise be required in order for the print node to determine whether the print job is intended to be confidential. Rather, the print job is identified as confidential by the print node merely by the transmission protocol that the print data is received on.

Upon receiving the data, the print node then processes the print data and digital certificate to securely store the print data. In step S504, the print node generates a unique symmetric key utilizing a symmetric encryption algorithm. The print node encrypts the print data with the symmetric key in step S505, encrypts the symmetric key with the public key of the print node, and stores the encrypted print data, either locally or remotely. Although the present invention is described as preferably utilizing a symmetric key, an asymmetric key, such as a public/private key pair, may also be utilized in the same manner as the symmetric key. It should also be noted that in a case where the print node is a printer, the print node uses the printer's public key to encrypt the symmetric key. However, in a case where the print node is a gateway to multiple printers, the print node uses the public key of the gateway to encrypt the symmetric key. The reasons for this distinction will be described in more detail below.

Finally with regard to the print node encryption process of FIG. 5, the print node submits print job identification information, the intended recipient identification information, storage location information for the stored encrypted print data, and the symmetric key encrypted (wrapped) with the printer's public key, to the print queue (step S506). The print node then waits for the intended recipient to arrive at the printer and present the proper authentication information in order to retrieve the print job and have it printed.

Figure 6:
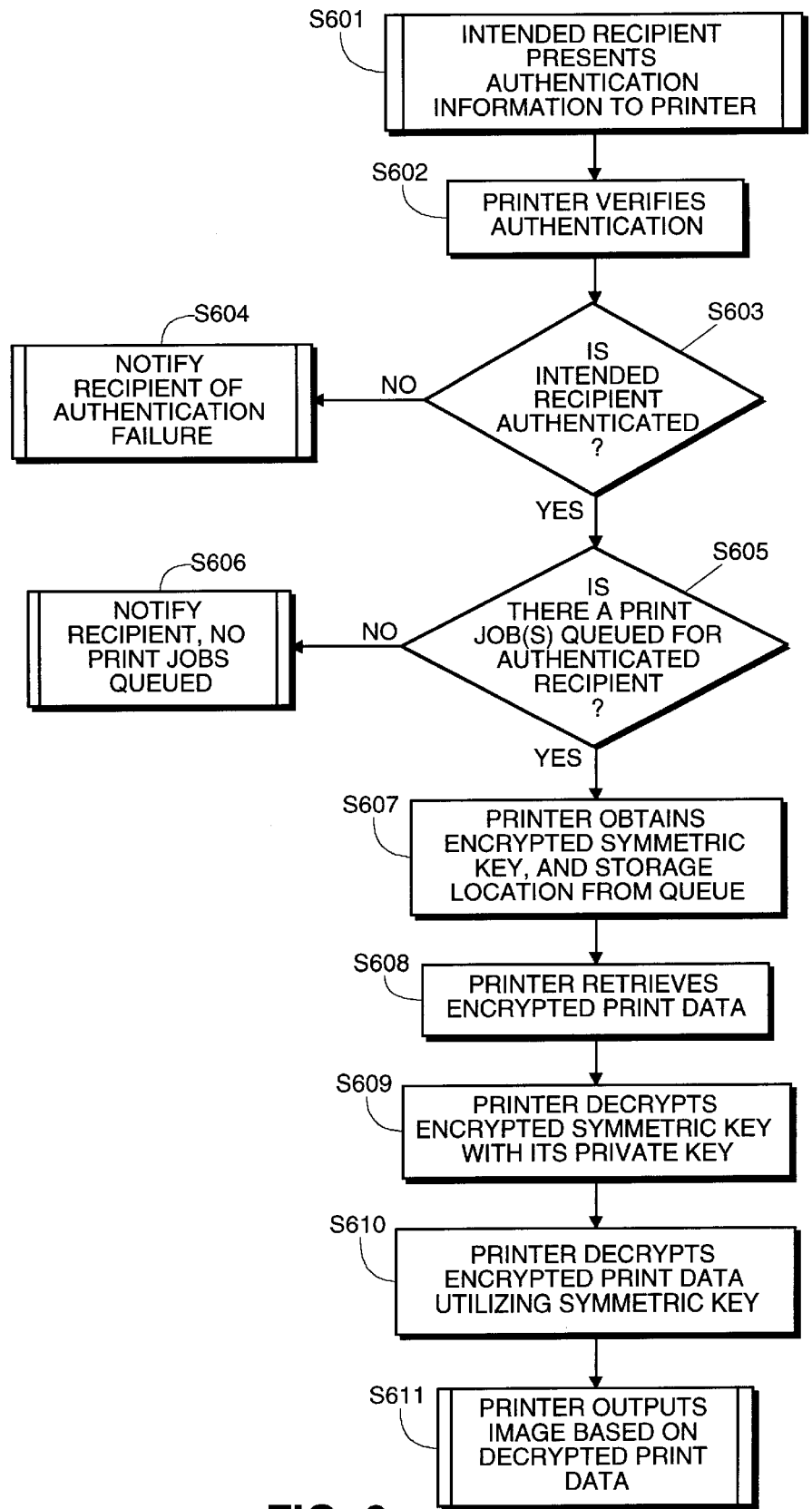
FIG. 6 is a flowchart depicting a print node decrypting encrypted print data and printing an image based on the decrypted print data where the print node is an image forming device itself.

FIG. 6 is a flowchart depicting the process whereby the aforementioned stored encrypted print data is printed out only in the presence of the intended recipient. In FIG. 6, the print node is a printer itself rather than a gateway; a gateway arrangement is described below with regard to FIGS. 7A, 7B and 8.

As seen in FIG. 6, the intended recipient presents authentication information to the printer to begin the printing process (step S601). This authentication process will now be described in more detail.

As briefly discussed above, in the present invention, a hard-copy printout submitted to a print node is not printed until the intended recipient arrives at the printer and is properly authenticated. The authentication process is generally initiated by the intended recipient presenting his unique identification information in digital form to the printer. For example, the intended recipient may insert a smart-card containing the aforementioned unique identification information identifying himself into a smart-card reader, such as smart-card reader 55.

Upon presenting the smart-card to the smart-card reader, the printer, such as printer 50, first verifies the integrity of the aforementioned unique identification information. The printer may then perform a "challenge/response" mechanism, or other process, to validate the identity of the recipient. If the recipient is authenticated (step S603), the printer then proceeds with the printout process. If the recipient is not authenticated, then notification is made of the authentication failure (step S604) by some means located at the printer. For example, the printer may contain a display device that presents a message to the recipient, or the printer itself may print out a sheet containing an error message.

Although the foregoing authentication process is described with regard to the use of smart-cards, other means of performing the authentication may also be employed. For example, the intended recipient could enter a PIN (Personal Identification Number) or a password from a keypad or touch display device located at the printer. The authentication may also be performed utilizing some other token reading device which contains the necessary information to permit the intended recipient to print out the image. Regardless of the means employed, so long as the proper authentication is provided by the intended recipient, the objectives of the present invention are achieved.

Once the intended recipient is authenticated, the printer then determines whether there are any print jobs queued for the intended recipient (step S605). In this process, the printer again utilizes the unique identification information of the intended recipient. The printer utilizes the information presented by the smart-card and compares it to the identification information stored in the print queue. If the printer determines that print jobs are queued for the intended recipient, the printout process continues. If however, the printer determines that no print jobs are queued for the intended recipient, then the recipient is notified that no print jobs are queued (step S606). Means similar to the above described means may be used for such notification.

After the printer determines that print jobs are queued for the intended recipient, the printer then retrieves the encrypted (wrapped) symmetric key and the print data storage location from the print queue (step S607). The printer then retrieves the encrypted print data (step S608) from the storage location for further processing.

Upon receiving the encrypted print data, the printer then decrypts (unwraps) the symmetric key obtained from the print queue using its private key (step S609), preferably via the printer's smartchip, then utilizes this symmetric key to decrypt the encrypted print data (step S610). This process is performed by well known techniques contained in encryption/decryption logic 355 of printer 50.

Finally, the decrypted print data is utilized by the printer to output an image based on the print data using image printing techniques known in the art (step S611).

Next, the present invention will be discussed for a case where the print node is a gateway to one or multiple printers.

Figure 7A:
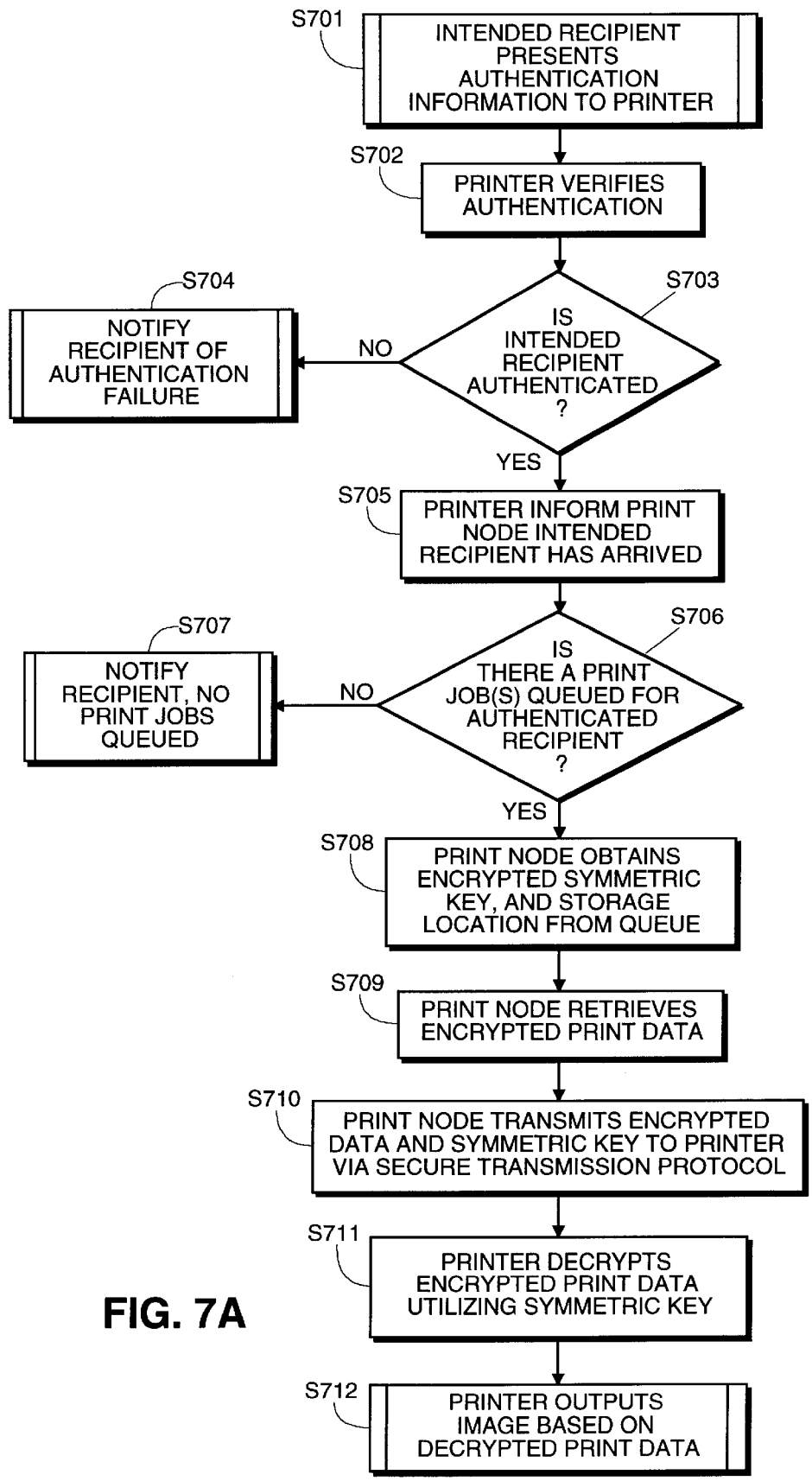
FIG. 7A is a flowchart depicting a print node transmitting encrypted print data and a symmetric key to an image forming device via a secure transmission protocol where the print node is a gateway to multiple image forming devices.
Figure 7B:
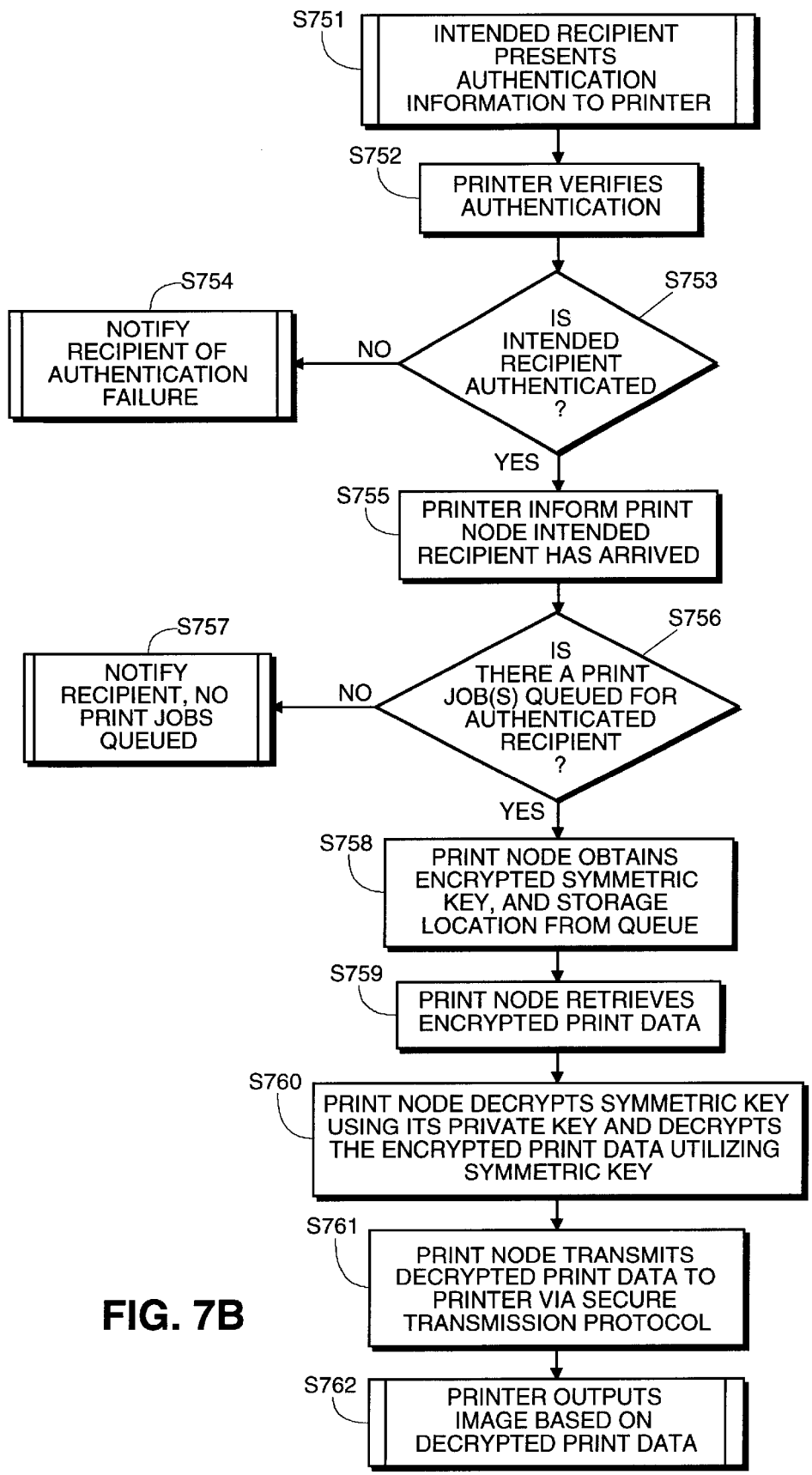
FIG. 7B is a flowchart depicting a print node decrypting encrypted print data and transmitting the decrypted print data to an image forming device via a secure transmission protocol where the print node is a gateway to multiple image forming devices.

In the following discussion, the print node is preferably contained within a network server, such as server 40. Therefore, the print node and the printer, or other type of image forming device, are remote from one another. As a result, the printer and print node communicate with one another via a communication link. In the present invention, two types of communication links will be discussed. In FIGS. 7A and 7B, the communication link is assumed to be a secure transmission protocol such as SSL; in FIG. 8, on the other hand, the communication link is assumed to be a standard TCP/IP protocol. As will become apparent in the following discussion, the process for transmitting data between the print node and the printer differs slightly depending on the type of communication link employed.

FIG. 7A is a flowchart depicting substantially the same process as discussed with regard to FIG. 6. However, some differences in the processing are present because the print node is a gateway rather than the printer itself.

In FIG. 7A, steps S701 through S704 correspond to steps S601 through S604. Accordingly, the discussion of those steps applies equally with regard to FIG. 7A and will not be repeated here.

After the printer authenticates the intended recipient (steps S702 and S703), the printer notifies the print node that the intended recipient has arrived at the printer (step S705).

Following notification by the printer that the intended recipient has arrived, the print node then performs the functions recited in steps S706 through S709 in the same manner as described with regard to steps S605 through S608 above. Namely, the print node determines whether any print jobs are queued for the intended recipient, obtains the encrypted symmetric key and storage location information, and retrieves the encrypted print data (step S709). At this point in the process, the next step taken by the print node differs depending on the type of communication link employed between the print node and the printer.

In FIG. 7A, recall that a secure transmission protocol is employed. Because a secure protocol is used, it is assumed that the environment between the print node and the printer has sufficient security that transmitting the symmetric key in encrypted form from the print node to the printer is not necessary. Therefore, as shown in FIG. 7A, once the print node retrieves the print data from the storage location, the print node uses its private key to decrypt the symmetric key and then transmits the encrypted print data and the symmetric key to the printer for processing by the printer (step S710).

Alternatively, as shown in FIG. 7B, rather than transmitting the symmetric key and encrypted print data to the printer for processing, the print node may decrypt the symmetric key using its private key, then use the symmetric key to decrypt the print data itself and transmit the decrypted print data to the printer (steps S760 and S761). With this embodiment, the printer is not required to decrypt the print data, but merely prints out an image based on the decrypted print data received from the print node. This is the preferred embodiment since the print node generally has greater resources available to perform the required decryption processes than does the printer. Although this is a somewhat less secure transmission than that described above with regard to FIG. 7A, the SSL protocol provides ample security for the data transmission between the print node and the printer, thereby achieving secure authorized printing of the image.

Figure 8:
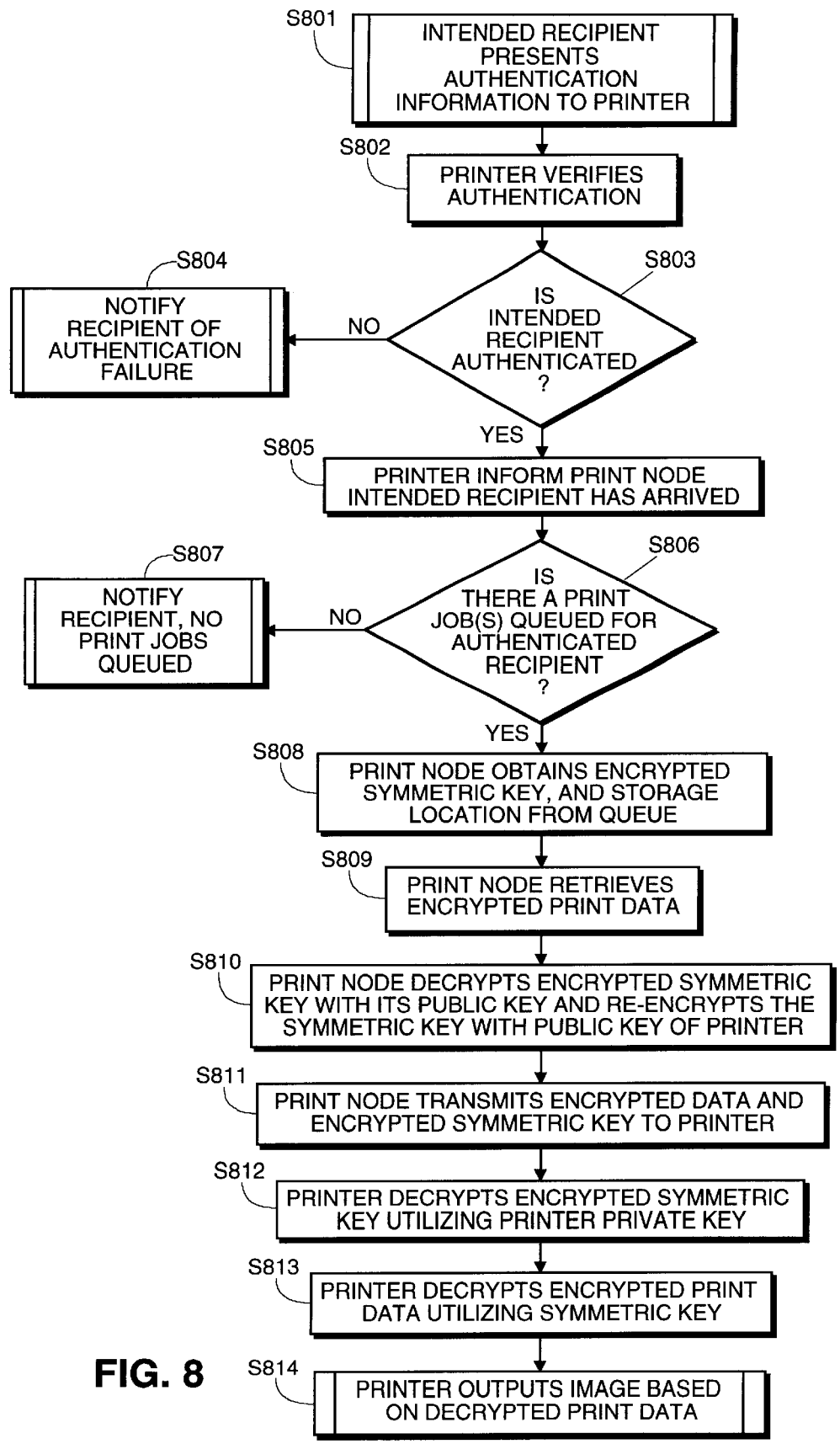
FIG. 8 is a flowchart depicting a print node transmitting an encrypted symmetric key and encrypted print data to an image forming device via a non-secure transmission protocol where the print node is a gateway to multiple image forming devices.

However, with reference to FIG. 8, it is assumed that a standard TCP/IP protocol is utilized between the print node and the printer. In this case, an additional encryption process is desired to provide security of the data during the transmission process from the print node to the printer in order to prevent electronic interception. Accordingly, in step S810, the print node decrypts the encrypted symmetric key using its private key, then reencrypts the symmetric key with the public key of the printer. In this manner, the symmetric key can only be decrypted by the private key of the destination printer. After encrypting the symmetric key with the printer's public key, the print node transmits the encrypted print data and the symmetric key encrypted with the printer's public key to the printer (step S811).

Referring again to FIG. 7A, upon receiving the encrypted print data and the symmetric key from the print node, the printer then decrypts the print data utilizing the symmetric key and prints out an image based on the decrypted print data (steps S711 and S712) in the same manner as described with regard to steps S610 and S611.

Again referring to FIG. 8, the processing by the printer after receiving the encrypted print data and encrypted symmetric key from the print node is slightly different than that described in FIG. 7A due to the encryption of the symmetric key as described above. In FIG. 8, upon receiving the encrypted print data and encrypted symmetric key, the printer utilizes its private key to decrypt the symmetric key (step S812). After decrypting the symmetric key, the printer then decrypts the print data and prints out an image based on the decrypted data (steps S813 and S814) in the same manner as described with regard to steps S610 and S611.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for authorized printout of an image in a printing system comprising an information processing device that transmits print data via a network to a print node for printout of the image, comprising the steps of:

the information processing device transmitting to the print node, via the network, print data identified as requiring user authentication in order to be printed out;

the print node receiving, via the network from the information processing device, the print data identified as requiring user authentication in order to be printed out;

the print node, upon receiving the print data from the information processing device, detecting that the received print data requires user authentication in order to be printed out and in response thereto, the print node performing a key encryption process on the received print data utilizing a unique encryption key maintained within the print node to generate encrypted print data and storing the encrypted print data without printout, wherein the stored encrypted print data includes encryption data corresponding to the key encryption process that is not included with the received print data;

the print node receiving authentication information of an intended recipient to print the encrypted print data; and in response to receipt of the authentication information, the print node decrypting the encrypted print data and performing an operation for printing the decrypted print data.

2. A method according to claim 1, wherein the unique encrypting key is a symmetric key randomly generated, utilized by a symmetric algorithm.

3. A method according to claim 1, wherein the unique encrypting key is a public key of a public/private key pair being primarily in the sole possession of the print node, utilized by an asymmetric algorithm.

4. A method according to claim 2, wherein the symmetric key is further encrypted using a public key of a public/private key pair being primarily in the sole possession of the print node.

5. A method according to claim 4, wherein the encryption is performed by a smart-chip residing in the print node.

6. A method according to claim 1, wherein the print node is an image forming device.

7. A method according to claim 1, wherein the print node is a gateway to multiple image forming devices.

8. A method according to claim 1, wherein the print data received by the print node is encrypted print data.

9. A method according to claim 8 further comprising the step of decrypting the encrypted print data received by the print node before said encrypting step.

10. A method according to claim 1, wherein the authentication information received by the print node is supplied at an image forming device.

11. A method according to claim 1, wherein the authentication information received by the print node is supplied utilizing a smart-card reader connected to the print node and located at an image forming device.

12. A method according to claim 1, wherein the print data received at the print node is identified as requiring user authentication in order to be printed out by the fact it has been received over a secure transmission protocol.

13. An apparatus for authorized printout of an image in a printing system comprising an information processing device that transmits print data via a network to the apparatus for printout of the image, comprising:
a memory including a region for storing executable process steps and data for the image; and
a processor for executing the executable process steps;
wherein the executable process steps comprise (a) the apparatus receiving, via the network from the information processing device, print data transmitted by the information processing device that is identified as requiring user authentication in order to be printed out; (b) the apparatus, upon receiving the print data from the information processing device, detecting that the received print data requires user authentication in order to be printed out and in response thereto, the apparatus performing a key encryption process on the received print data utilizing a unique encryption key maintained within the apparatus to generate encrypted print data and storing the encrypted print data without printout, wherein the stored encrypted print data includes encryption data corresponding to the key encryption process that is not included with the received print data; (c) the apparatus receiving authentication information of an intended recipient to print the encrypted print data; and (d) in response to receipt of the authentication information, the apparatus decrypting the encrypted print data and performing an operation for printing the decrypted print data.

14. An apparatus according to claim 13, wherein the unique encrypting key is a symmetric key randomly generated, utilized by a symmetric algorithm.

15. An apparatus according to claim 13, wherein the unique encrypting key is a public key of a public/private key pair being primarily in the sole possession of the apparatus, utilized by an asymmetric algorithm.

16. An apparatus according to claim 14, wherein the symmetric encrypting key is further encrypted using a public key of a public/private key pair being primarily in the sole possession of the apparatus.

17. An apparatus according to claim 16, wherein the encryption is performed by a smart-chip residing in the apparatus.

18. An apparatus according to claim 13, wherein the apparatus is an image forming device.

19. An apparatus according to claim 13, wherein the apparatus is a gateway to multiple image forming devices.

20. An apparatus according to claim 13, wherein the print data received by the print node is encrypted print data.

21. An apparatus according to claim 20 further comprising the step of decrypting the encrypted print data received by the print node before said encrypting step.

22. An apparatus according to claim 13, wherein the authentication information received by the apparatus is supplied at an image forming device.

23. An apparatus according to claim 13, wherein the authentication information received by the apparatus is supplied utilizing a smart-card reader connected to the apparatus and located at an image forming device.

24. An apparatus according to claim 13, wherein the print data received by the apparatus is identified as requiring user authentication in order to be printed out by the fact it has been received over a secure transmission protocol.

25. A computer-readable medium which stores computer-executable process steps for authorized printout of an image in a printing system comprising an information processing device that transmits print data via a network to a print node for printout of the image, the computer-executable process steps comprising:
the information processing device transmitting to the print node, via the network, print data identified as requiring user authentication in order to be printed out;
the print node receiving, via the network from the information processing device, the print data identified as requiring user authentication in order to be printed out;
the print node, upon receiving the print data from the information processing device, detecting that the received print data requires user authentication in order to be printed out and in response thereto, the print node performing a key encryption process on the received print data utilizing a unique encryption key maintained within the print node to generate encrypted print data and storing the encrypted print data without printout, wherein the stored encrypted print data includes encryption data corresponding to the key encryption process that is not included with the received print data;
the print node receiving authentication information of an intended recipient to print the encrypted print data; and
in response to receipt of the authentication information, the print node decrypting the encrypted print data and performing an operation for printing the decrypted print data.

26. A computer-readable medium according to claim 25, wherein the unique encrypting key is a symmetric key randomly generated, utilized by a symmetric algorithm.

27. A computer-readable medium according to claim 25, wherein the unique encrypting key is a public key of a public/private key pair being primarily in the sole possession of the print node, utilized by an asymmetric algorithm.

28. A computer-readable medium according to claim 26, wherein the symmetric encrypting key is further encrypted using a public key of a public/private key pair being primarily in the sole possession of the print node.

29. A computer-readable medium according to claim 28, wherein the encryption is performed by a smart-chip residing in the print node.

30. A computer-readable medium according to claim 25, wherein the print node is an image forming device.

31. A computer-readable medium according to claim 25, wherein the print node is a gateway to multiple image forming devices.

32. A computer-readable medium according to claim 25, wherein the print data received by the print node is encrypted print data.

33. A computer-readable medium according to claim 32 further comprising the step of decrypting the encrypted print data received by the print node before said encrypting step.

34. A computer-readable medium according to claim 25, wherein the authentication information received by the print node is supplied at an image forming device.

35. A computer-readable medium according to claim 25, wherein the authentication information received by the print node is supplied utilizing a smart-card reader connected to the print node and located at an image forming device.

36. A computer-readable medium according to claim 25, wherein the print data received at the print node is identified as requiring user authentication in order to be printed out by the fact it has been received over a secure transmission protocol.

37. An image forming device for authorized printout of an image, comprising:

a receiver for receiving print data transmitted via a network to the image forming device from an information processing device, the print data being identified by the information processing device as requiring user authentication in order to be printed out;

an image generator for generating an image from the received print data;

a memory including a region for storing executable process steps; and a processor for executing the executable process steps, wherein the executable process steps comprise: (a) the receiver receiving, via the network from the information processing device, the print data identified as requiring user authentication in order to be printed out; (b) the image forming device, upon receiving the print data from the information processing device, detecting that the received print data requires user authentication in order to be printed out and in response thereto, the image forming device performing a key encryption process on the received print data utilizing a unique encryption key maintained within the image forming device to generate encrypted print data and storing the encrypted print data without printout, wherein the stored encrypted print data included encryption data corresponding to the key encryption process that is not included with the received print data; (c) the image forming device receiving authentication information of an intended recipient to print the encrypted print data; and (d) in response to receipt of the authentication information, the image forming device decrypting the encrypted print data and the image generator performing a process to print the decrypted print data.

38. An image forming device according to claim 37, wherein the unique encrypting key is a symmetric key randomly generated, utilized by a symmetric algorithm.

39. An image forming device according to claim 37, wherein the unique encrypting key is a public key of a public/private key pair being primarily in the sole possession of the image forming device, utilized by an asymmetric algorithm.

40. An image forming device according to claim 38, wherein the symmetric encrypting key is further encrypted using a public key of a public/private key pair being primarily in the sole possession of the image forming device.

41. An image forming device according to claim 40, wherein the encryption is performed by a smart-chip residing in the image forming device.

42. An image forming device according to claim 37, wherein the print data received by the receiver is encrypted print data.

43. An image forming device according to claim 42, further comprising the step of decrypting the encrypted print data received by the receiver before said encrypting step.

44. An image forming device according to claim 37, wherein the authentication information received by the image forming device is supplied at the image forming device.

45. An image forming device according to claim 37, wherein the authentication information received by the image forming device is supplied utilizing a smart-card reader connected to the image forming device and located at the image forming device.

46. An image forming device according to claim 37, wherein the print data received by the receiver is identified as requiring user authentication in order to be printed out by the fact it has been received over a secure transmission protocol.

47. A method according to claim 12, wherein the secure transmission protocol comprises one of SSL (Secure Sockets Layer) and TLS (Transport Layer Security), and the print node detects that the print data requires user authentication in order to be printed out merely by the fact that the print data is received via SSL or TLS.

48. An apparatus according to claim 24, wherein the secure transmission protocol comprises one of SSL (Secure Sockets Layer) and TLS (Transport Layer Security), and the print node detects that the print data requires user authentication in order to be printed out merely by the fact that the print data is received via SSL or TLS.

49. A computer-readable medium according to claim 36, wherein the secure transmission protocol comprises one of SSL (Secure Sockets Layer) or TLS (Transport Layer Security), and the print node detects that the print data requires user authentication in order to be printed out merely by the fact that the print data is received via SSL or TLS.

50. An image forming device according to claim 46, wherein the secure transmission protocol comprises one of SSL (Secure Sockets Layer) and TLS (Transport Layer Security), and the print node detects that the print data requires user authentication in order to be printed out merely by the fact that the print data is received via SSL or TLS.

* * * * *